United States Patent
Jin et al.

(10) Patent No.: US 11,300,970 B2
(45) Date of Patent: Apr. 12, 2022

(54) WEATHER GUIDANCE SYSTEM AND WEATHER GUIDANCE PROGRAM

(71) Applicant: Toyota Jidosha Kabushiki Kaisha, Toyota (JP)

(72) Inventors: Xin Jin, Nagoya (JP); Taiki Nakamura, Toyoake (JP); Shota Kishino, Anjo (JP); Kazuki Minamiyama, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 16/715,655

(22) Filed: Dec. 16, 2019

(65) Prior Publication Data
US 2020/0201346 A1    Jun. 25, 2020

(30) Foreign Application Priority Data

Dec. 19, 2018   (JP) .............................. JP2018-236910

(51) Int. Cl.
   *G05D 1/02*     (2020.01)
   *G05D 1/00*     (2006.01)
   *G01W 1/10*     (2006.01)

(52) U.S. Cl.
   CPC ............ *G05D 1/0229* (2013.01); *G01W 1/10* (2013.01); *G05D 1/0044* (2013.01); *G05D 1/0212* (2013.01); *G05D 2201/0213* (2013.01)

(58) Field of Classification Search
   CPC .. G05D 1/0229; G05D 1/0044; G05D 1/0212; G05D 2201/0213; G01W 1/10
   USPC ........................................................ 701/23
   See application file for complete search history.

(56) References Cited

U.S. PATENT DOCUMENTS

| | | | |
|---|---|---|---|
| 10,593,200 B2* | 3/2020 | Masuda | G08G 1/096733 |
| 11,164,455 B2* | 11/2021 | Oba | G08G 1/163 |
| 2012/0123806 A1* | 5/2012 | Schumann, Jr. | G06Q 40/08 705/4 |
| 2014/0074402 A1* | 3/2014 | Hassib | G01C 21/3461 701/533 |
| 2016/0047666 A1* | 2/2016 | Fuchs | G06Q 40/08 701/423 |
| 2017/0241791 A1* | 8/2017 | Madigan | G06Q 40/08 |

FOREIGN PATENT DOCUMENTS

| | | |
|---|---|---|
| JP | H09321639 A | 12/1997 |
| JP | 2010-008432 A | 1/2010 |
| JP | 2014-010079 A | 1/2014 |
| JP | 2014-098784 A | 5/2014 |
| JP | 2019-132654 A | 8/2019 |

* cited by examiner

*Primary Examiner* — Yazan A Soofi
(74) *Attorney, Agent, or Firm* — Dinsmore & Shohl LLP

(57) ABSTRACT

A weather guidance system is configured to guide a weather event having occurred around a user during moving, and includes: a guided event acquiring unit configured to acquire a guided event being a weather event previously guided to the user; and a guidance control unit configured to determine that when a new event being a new weather event having occurred around the user is acquired, the new event that is identical in weather type to the guided event and that has an occurrence region without overlapping with that of the guided event is guided, and the new event that is identical in weather type to the guided event and that has an occurrence region overlapping with that of the guided event is not to be guided.

15 Claims, 3 Drawing Sheets

| ID | Weather type | Risk level | Occurrence region | Peripheral flag | Guidance time |
|---|---|---|---|---|---|
| 0001 | Flood | L3 | P01,P02,P03,P04 | ○ | T1 |
| 0002 | Tornado | L2 | P05,P06,P07 | ○ | T2 |
| 0003 | Wildfire | L2 | P08,P09,P10,P11 | ○ | T3 |
| 0004 | Flood | L1 | P12,P13,P14 | ○ | None (FIG. 2B)<br>T4 (FIG. 2C) |
| ⋮ | ⋮ | ⋮ | ⋮ | ⋮ | ⋮ |

WEATHER GUIDANCE SYSTEM AND WEATHER GUIDANCE PROGRAM

CROSS-REFERENCE TO RELATED APPLICATION

This application claims priority to Japanese Patent Application No. 2018-236910 filed on Dec. 19, 2018 incorporated herein by reference in its entirety.

BACKGROUND

(1) Technical Field

The present disclosure relates to a weather guidance system and a weather guidance program.

(2) Description of Related Art

There is known an electronic wristwatch that generates a signal for instructing a buzzer to sound an alarm when the current weather is different from the weather previously guided (refer to JP 09-321639 A). According to JP 09-321639 A, the same weather can be avoided being repeatedly alarmed and user's troublesomeness can be reduced.

SUMMARY

According to JP 09-321639 A, when the weather occurring in a destination area is identical to the weather previously guided, no alarm is sounded. Even when the weather is identical to the weather previously guided, the weather previously guided and the destination weather may be different from each other in occurrence factors, severity, or the like. Thus, there is a problem that a user cannot recognize the weather even though the weather different in occurrence factors, severity, or the like occurs in the destination area.

The present disclosure is made in view of the above problems, and an object thereof is to provide a technique capable of appropriately guiding a weather event occurring in a destination area.

To achieve the above object, a weather guidance system of the present disclosure is configured to guide a weather event having occurred around a user during moving, and includes: a guided event acquiring unit configured to acquire a guided event being a weather event previously guided to the user; and a guidance control unit configured to determine that when a new event being a new weather event having occurred around the user is acquired, the new event that is identical in weather type to the guided event and that has an occurrence region without overlapping with an occurrence region of the guided event is guided, and the new event that is identical in weather type to the guided event and that has an occurrence region overlapping with the occurrence region of the guided event is not to be guided.

To achieve the above object, a weather guidance program of the present disclosure is configured to cause a computer to serve as a weather guidance system configured to guide a weather event having occurred around a user during moving, and the weather guidance program causes the computer to serve as: a guided event acquiring unit configured to acquire a guided event that is a weather event previously guided to the user; and a guidance control unit configured to determine that when a new event being a new weather event having occurred around the user is acquired, the new event that is identical in weather type to the guided event and that has an occurrence region without overlapping with an occurrence region of the guided event is guided, and the new event that is identical in weather type to the guided event and that has an occurrence region overlapping with the occurrence region of the guided event is not to be guided.

The above-described configuration enables a new event having an occurrence region without overlapping with that of the guided event to be newly guided even when the new event is identical in weather type to the guided event. The new event having the occurrence region without overlapping with that of the guided event is probably different from the guided event in occurrence factors, severity, or the like, so that it can be estimated that there is a great need for new guidance to the user. The new event having an occurrence region overlapping with that of the guided event probably has occurrence factors, severity, or the like, common to those of the guided event, so that it can be estimated that there is little need for new guidance to the user. Thus, a new event having occurred at a destination, being highly required to be guided to the user, can be guided, so that a weather event having occurred in an area of the destination can be appropriately guided.

DETAILED DESCRIPTION

Here, embodiments of the present disclosure will be described in the following order.

(1) Configuration of weather guidance system:
(2) Weather guidance processing:
(3) Other embodiments:

(1) Configuration of Weather Guidance System

Figure 1:
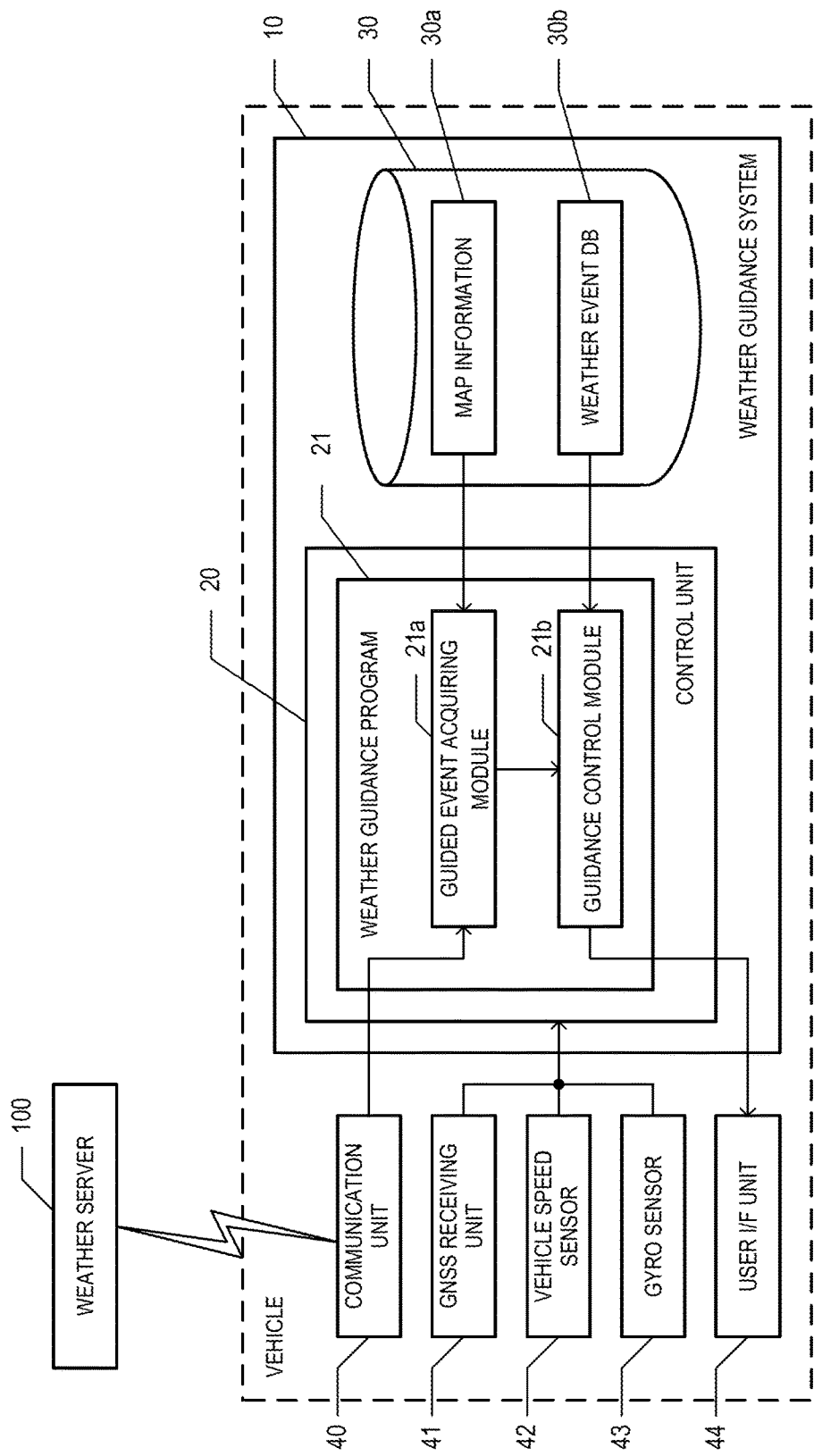
FIG. 1 is a block diagram of a weather guidance system.

FIG. 1 is a block diagram illustrating a configuration of a weather guidance system 10 according to an embodiment of the present disclosure. The weather guidance system 10 is a vehicle-mounted device mounted on a vehicle, and a user is a vehicle occupant. The weather guidance system 10 is configured to guide weather events having occurred around a user during moving, and includes a control unit 20 and a recording medium 30. The control unit 20 includes a CPU, a RAM, a ROM, and the like, and executes a weather guidance program 21 stored in the recording medium 30 or the ROM.

The recording medium 30 records map information 30a and a weather event DB (Database) 30b. The map information 30a includes node data and link data. The node data indicates coordinates of a node to which two or more links are connected, for example. The links each correspond to a road section obtained by dividing the road for each connection point. A node to which three or more links are connected, i.e., a connection point to which three or more road sections are connected, means an intersection. The intersection includes a junction and a branch point. The node data indicates a connection section that is a road section connected to the node.

The link data indicates various kinds of information about the road section. The link data also indicates a shape of the road section. The road section has a line shape specified by shape interpolation point data (not illustrated) indicating coordinates of a shape interpolation point set in a length direction of the road. The link data indicates a section length and a required time for each road section. The section length and the required time of a road section are used for searching for a planned travel route. Details of the weather event DB 30b will be described later.

The vehicle includes a communication unit 40, a global navigation satellite system (GNSS) receiving unit 41, a vehicle speed sensor 42, a gyro sensor 43, and a user IF unit 44. The communication unit 40 is a wireless communication circuit for communicating with a weather server 100. The weather server 100 collects various kinds of information obtained by measuring and investigating the weather, and generates weather event information based on the collected information. The weather server 100 delivers the weather event information to the weather guidance system 10. Details of the weather event information will be described later.

The GNSS receiving unit 41 receives radio waves from a GNSS satellite and outputs a signal for calculating a current location of the vehicle via an interface (not illustrated). The current location of the vehicle means the current location of the user. The vehicle speed sensor 42 outputs a signal corresponding to a rotational speed of wheels provided in the vehicle. The control unit 20 acquires a vehicle speed based on a signal from the vehicle speed sensor 42. The gyro sensor 43 detects angular acceleration about turning in a horizontal plane of the vehicle, and outputs a signal corresponding to a direction of the vehicle. The control unit 20 acquires a traveling direction of the vehicle based on the signal from the gyro sensor 43. The control unit 20 also acquires the current location of the vehicle by specifying a traveling trajectory of the vehicle based on output signals from the vehicle speed sensor 42, the gyro sensor 43, and the like. The output signal of the GNSS receiving unit 41 is used to correct the current location of the vehicle specified by the vehicle speed sensor 42, the gyro sensor 43, and the like.

The user I/F unit 44 is configured to provide various kinds of information to the user and receive user instructions, and specifically includes a touch panel display and a speaker. The control unit 20 outputs a control signal to the touch panel display to cause the touch panel display to output various images such as a map and a weather guidance image. The control unit 20 also outputs a control signal to the speaker to cause the speaker to output various guidance voices. In addition, the control unit 20 acquires a user operation based on a touch operation on the touch panel display.

The weather guidance program 21 includes a guided event acquiring module 21a and a guidance control module 21b. The guided event acquiring module 21a and the guidance control module 21b are program modules that cause the control unit 20 as a computer to function as a guided event acquiring unit and a guidance control unit, respectively.

The control unit 20 acquires a guided event being a weather event that has been previously guided to the user using a function of the guided event acquiring module 21a. Thus, when the control unit 20 receives the weather event information indicating the weather event from the weather server 100 using the function of the guided event acquiring module 21a, the control unit 20 records the weather event information in the weather event DB 30b.

Figures 2, 2A, 2B, 2C:
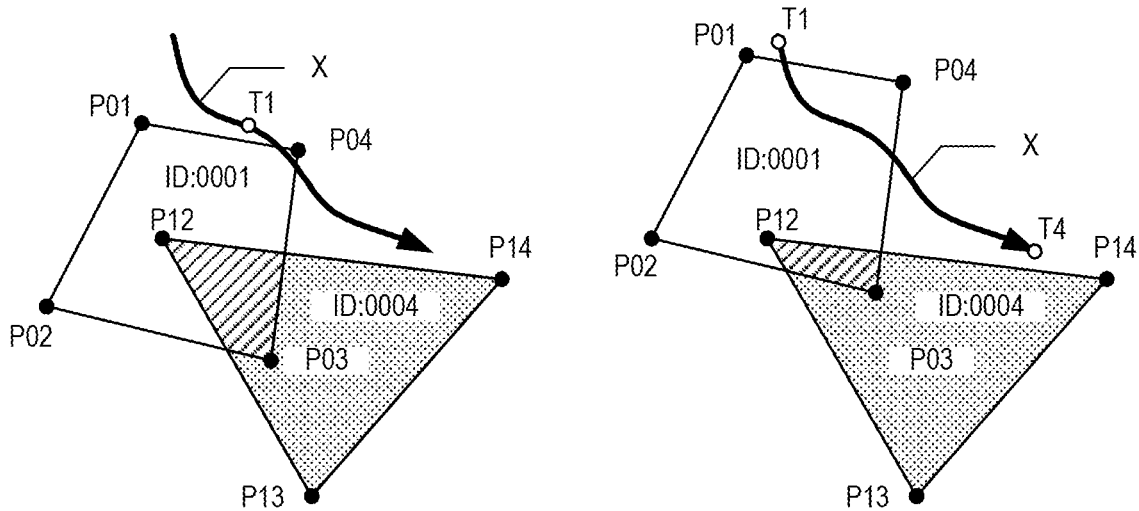
FIG. 2A is a table showing a weather event DB.
FIGS. 2B and 2C are each a schematic diagram of an occurrence region.

FIG. 2A illustrates the weather event DB 30b. The weather event DB 30b accumulates weather event information for each weather event. When receiving the weather event information, the control unit 20 accumulates the received weather event information in the weather event DB 30b. The weather event information indicates an ID, a weather type, a risk level, an occurrence region, a peripheral flag, and a guidance time.

The ID is an identification code unique to a weather event. The risk level is a degree of danger of a weather event and is a value set by the weather server 100. FIG. 2A exemplifies L1 to L3 as the risk levels, and the risk levels each have a magnitude as follows: L3>L2>L1. The weather type is a type of weather event, and FIG. 2A exemplifies, "Flood", "Tornado", and "Wildfire" as weather events.

The occurrence region is a region where a weather event occurs, and FIG. 2A illustrates coordinates P01 to P14 of vertices of a polygon approximating to the occurrence region. The occurrence region may be a region of an administrative district where a weather event occurs, or a region having an arbitrary shape.

The peripheral flag is attached to a weather event that occurs around the user during moving, and is attached to a weather event to be guided. FIG. 2A shows "o" indicating that the peripheral flag is turned on. The control unit 20 may turn on the peripheral flag from the beginning when the weather event information is received, or may turn on the peripheral flag afterwards in accordance with change in the current location of the vehicle after receiving the weather event information.

Here, the weather event having occurred around the user during moving may be a weather event in an occurrence region in which a current location of the vehicle exists, or may include a weather event in an occurrence region having a shortest distance from the current location of the vehicle within a predetermined distance (e.g., 10 km). In addition, the weather event having occurred around the user during moving may include a weather event in an occurrence region having a distance on a planned travel route from a current location of the vehicle to the occurrence region within a predetermined determination distance (e.g., 10 km). The planned travel route may be a route searched by a known route search method, and may be a route searched with the shortest required period of time or the shortest travel distance to a destination.

When the guidance of the weather event is completed, the function of the guided event acquiring module 21a allows the control unit 20 to record a guidance time at which the guidance is performed into the weather event DB 30b. Meanwhile, the control unit 20 records the fact that there is no guidance time into the weather event DB 30b for weather event information for which guidance is not completed.

The function of the guided event acquiring module 21a allows the control unit 20 to acquire a weather event having been guided to the user from the last turning-on of the vehicle in which the user rides until the present as a guided event. Specifically, the control unit 20 acquires a weather event, for which a time after the last turning-on (ACC-ON) of the vehicle is recorded as a guidance time in the weather event DB 30b, as a guided event. That is, the control unit 20 acquires a weather event having been guided during a period of time from a start of moving of the user riding on the vehicle until the present as a guided event. The control unit 20 may acquire the time when a main power source of the weather guidance system 10 is turned on as the time when the vehicle is turned on.

The function of the guidance control module 21b allows the control unit 20 to determine that when a new event being a new weather event having occurred around the user is acquired, the new event that is identical in weather type to the guided event and that has an occurrence region without overlapping with that of the guided event is guided, and the new event that is identical in weather type to the guided event and that has an occurrence region overlapping with that of the guided event is not to be guided. Specifically, when the function of the guidance control module 21b allows the control unit 20 to newly receive weather event information causing a peripheral flag to be turned on, or to turn on the peripheral flag after receiving the weather event information, a weather event indicated by the weather event information is acquired as a new event.

Then, the function of the guidance control module 21b allows the control unit 20 to acquire a weather type and an occurrence region for each of the guided event and the new event. The control unit 20 then determines whether there is a guided event of the weather type identical to the weather type of the new event. When there is no guided event of the weather type identical to the weather type of the new event, the control unit 20 determines to guide the new event.

In FIG. 2A, when the weather event with ID 0001 is a guided event and the weather event with ID 0002 is a new event, the control unit 20 determines that "Tornado" indicated as a weather type of the new event is not identical to "Flood" indicated as a weather type of the guided event, and determines to guide the new event. In addition, when the weather events with IDs 0001 and 0002 are each a guided event and the weather event with ID 0003 is a new event, the control unit 20 determines that "Wildfire" indicated as a weather type of the new event is not identical to "Tornado" or "Flood" indicated as a weather type of the guided event, and determines to guide the new event.

On the other hand, when a weather type of a new event is identical to a weather type of a guided event, the function of the guidance control module 21b allows the control unit 20 to determine whether occurrence regions of the new event and the guided event that have the identical weather type overlap with each other. In FIG. 2A, when the weather events with IDs 0001, 0002, and 0003 are guided events, and the weather event with ID 0004 is a new event, the control unit 20 determines that "Flood" indicated as a weather type of the new event is identical to the weather type of the guided event with ID 0001, and then determines whether an occurrence region of the new event with ID 0004 and an occurrence region of the guided event with ID 0001 overlap with each other.

The function of the guidance control module 21b allows the control unit 20 to determine that the occurrence regions of the new event and the guided event overlap with each other when an area ratio of a portion where the occurrence region of the new event overlaps with the occurrence region of the guided event is equal to or more than a threshold. The function of the guidance control module 21b allows the control unit 20 to calculate a total area that is an area of the occurrence region of the new event. The function of the guidance control module 21b also allows the control unit 20 to calculate an overlapping area that is an area of the portion where the occurrence region of the new event overlaps with the occurrence region of the guided event having the identical weather type. Then, when the area ratio obtained by dividing the overlapping area by the total area is equal to or more than the threshold (e.g., 30%), the control unit 20 determines that the occurrence regions of the new event and the guided event overlap with each other.

When there is a plurality of guided events identical in weather type to a new event, the control unit 20 may calculate an area of a portion where at least one of occurrence regions of the respective guided events overlaps with an occurrence region of the new event, as an overlapping area. In addition, when there is a plurality of guided events identical in weather type to a new event, the control unit 20 may calculate an area of a portion where an occurrence region of a guided event guided last overlaps with an occurrence region of the new event, as an overlapping area.

FIGS. 2B and 2C each illustrate an overlapping region when the weather events with IDs 0001, 0002, and 0003 shown in FIG. 2A are guided events, and the weather event with ID 0004 is a new event. FIGS. 2B and 2C each indicate a trajectory X along which the user has moved, with a thick arrow. FIGS. 2B and 2C each illustrate an overlapping region between an occurrence region (P12, P13, P14) of the new event (ID: 0004) that is the weather event of "Flood" and an occurrence region (P01, P02, P03, P04) of the guided event (ID: 0001) that is the weather event of "Flood", with diagonal hatching. The guided event (ID: 0001) has been guided at a point (white circle) of the user located at a guidance time TI on the trajectory X. The occurrence region (P12, P13, P14) of the new event (ID: 0004) includes an overlapping region indicated by diagonal hatching and a region indicated by dot hatching.

In each of FIGS. 2B and 2C, an area ratio of the overlapping region is obtained by dividing an overlapping area, which is an area of the overlapping region indicated by diagonal hatching, by a total of the overlapping area and an area of the region indicated by dot hatching. In FIG. 2B, the area ratio obtained by dividing the overlapping area by the total area is equal to or more than the threshold, so that it is determined that the new event with ID 0004 is not to be guided. In this case, the new event with ID 0004 is not guided, and no guidance time is recorded in the weather event DB 30b. In FIG. 2C, the area ratio obtained by dividing the overlapping area by the total area is less than the threshold, so that it is determined that the new event with ID 0004 is guided. In this case, the new event with ID 0004 is guided, and a guidance time T4 is recorded in the weather event DB 30b.

In addition, the function of the guidance control module 21b allows the control unit 20 to determine to guide a new event having a risk level equal to or higher than a reference value regardless of whether the new event is identical in weather type to the guided event. Specifically, the function of the guidance control module 21b allows the control unit 20 to determine that a new event having a risk level equal to or higher than a reference value (L3) is to be guided even when the new event is identical in weather type to the guided event. In FIG. 2A, the new event with ID 0004 has a risk level that is not equal to or higher than the reference value, so that it is determined whether the new event is guided in accordance with identity of its weather type with that of the guided event or a determination result of whether their occurrence regions overlap with each other. On the other hand, in FIG. 2A, the new event with ID 0001 has a risk level equal to or higher than the reference value, so that it is determined to guide the new event without determining the identity of its weather type with that of the guided event or determining whether their occurrence regions overlap with each other.

The function of the guidance control module 21b allows the control unit 20 to cause the user I/F unit 44 to guide the new event determined to be guided. In the present embodiment, the control unit 20 causes the user I/F unit 44 to output a voice message indicating a weather type and an outline of an occurrence region. The outline of the occurrence region may be a name of each administrative division having a region overlapping with the occurrence region, or a name of an administrative division where the center of gravity of the occurrence region exists. In addition, the control unit 20 may guide a size of the occurrence region. The size of the occurrence region may be an area of the occurrence region, a radius of a circle having an area equal to the area of the occurrence region, or a radius of an inscribed circle or a circumscribed circle of the occurrence region. The control unit 20 may output the voice message, and cause the user I/F unit 44 to display a button for transition to a screen showing details of a new event or another weather event.

In the configuration of the present embodiment described above, when acquiring a new event that is a new weather event having occurred around a user, the control unit 20 determines to guide the new event that is identical in weather type to the guided event and that has an occurrence region without overlapping with that of the guided event, and determines not to guide the new event that is identical in weather type to the guided event and that has an occurrence region overlapping with that of the guided event. This configuration enables a new event having an occurrence region without overlapping with that of the guided event to be newly guided even when the new event is identical in weather type to the guided event.

As illustrated in FIG. 2C, the new event having the occurrence region without overlapping with that of the guided event is probably different from the guided event in occurrence factors, severity, or the like, so that it can be estimated that there is a great need for new guidance to the user. On the other hand, as illustrated in FIG. 2B, the new event having an occurrence region overlapping with that of the guided event probably has occurrence factors, severity, or the like, common to those of the guided event, so that it can be estimated that there is little need for new guidance to the user. Thus, a new event having occurred at a destination, being highly required to be guided to the user, can be guided, so that a weather event having occurred in an area of the destination can be appropriately guided.

In addition, a higher ratio of an area of a portion (diagonal hatching in each of FIGS. 2B and 2C) where occurrence regions overlap with each other increases possibility that a new event has occurrence factors, severity, or the like, common to those of the guided event. Thus, a level of necessity to newly guide the new event to the user can be appropriately determined.

The control unit 20 is configured to acquire a weather event having been guided to the user after the last turning-on of the vehicle in which the user rides until the present as a guided event. Accordingly, a weather event that is identical in weather type to a guided event and that has an occurrence region overlapping with that of the guided event can be prevented from being repeatedly guided in one travel (from departure to parking). On the other hand, when travel is started again, a weather event can be guided without restriction.

In addition, the control unit 20 is configured to determine to guide a new event having a risk level equal to or higher than a reference value regardless of whether the new event is identical in weather type to the guided event. Accordingly, a weather event with a risk level equal to or higher than the reference value can be guided even when the weather event is identical in weather type to the guided event. This enables the user to reliably recognize the weather event with the risk level equal to or higher than the reference value.

(2) Weather Guidance Processing

Figure 3:
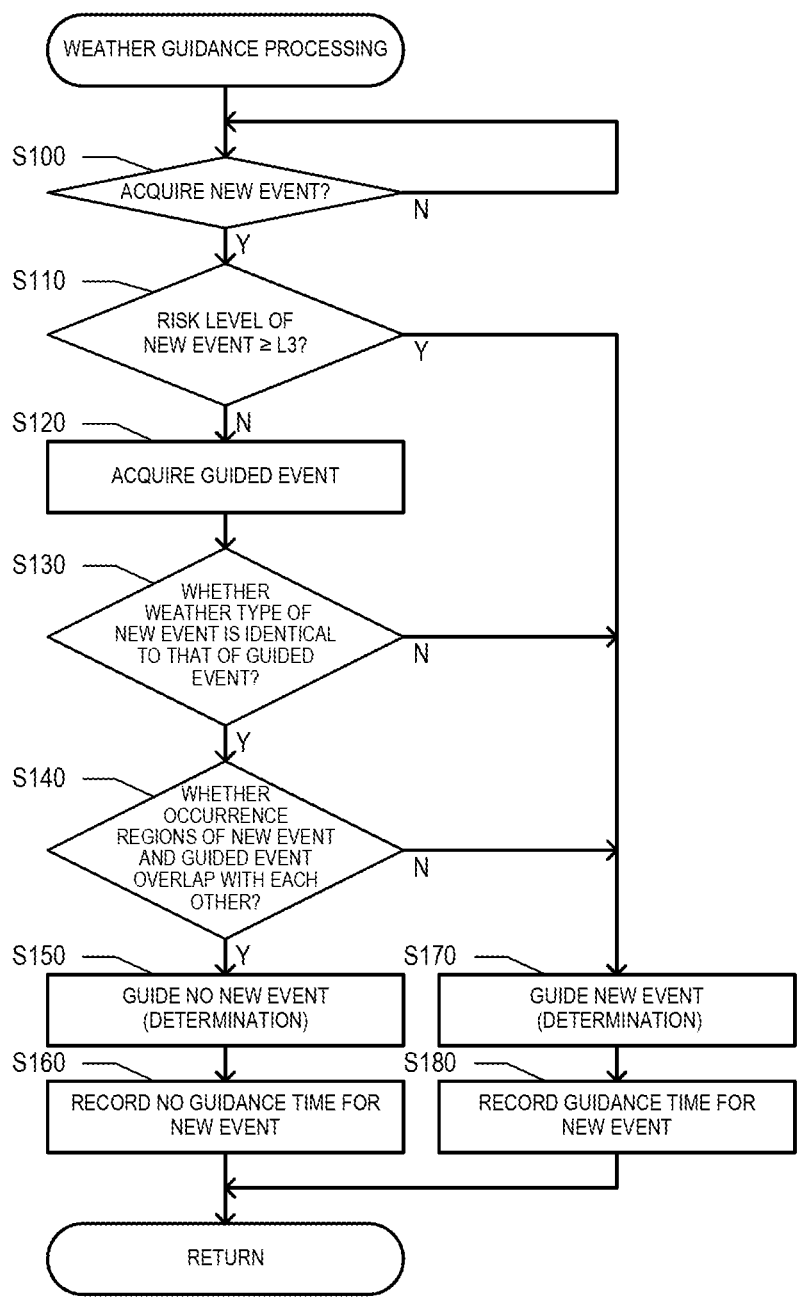
FIG. 3 is a flowchart of weather guidance processing.

Next, weather guidance processing executed by a function of the weather guidance program 21 will be described. FIG. 3 is a flowchart of the weather guidance processing. The weather guidance processing is always executed during traveling of a vehicle.

First, the function of the guidance control module 21b allows the control unit 20 to determine whether a new event is acquired (step S100). That is, the control unit 20 determines whether a weather event causing a peripheral flag to be turned on is newly acquired. Acquiring a new weather event causing the peripheral flag to be turned on includes a case of receiving new weather event information indicating a weather event having occurred around a user during moving, and a caser where after receiving the weather event information, the vehicle moves to a current location around an occurrence region of the weather event. When a power source of the vehicle is turned on, the control unit 20 configured to turn on peripheral flags for all occurrence regions of respective weather events, existing around the current location of the vehicle, in weather events recorded in the weather event DB 30b, and to acquire the respective weather events in order as new events.

When it is not determined that a new event is not acquired (N at step S100), the function of the guidance control module 21b allows the control unit 20 to return processing to step S100 and to wait until a new event is acquired. That is, the control unit 20 continues to wait for reception of weather event information and monitoring of the current location of the vehicle until acquiring a new event.

On the other hand, when it is determined that a new event is acquired (Y at step S100), the function of the guidance control module 21b allows the control unit 20 to determine whether a risk level of the new event is equal to or higher than the reference value (L3) (step S110).

When it is not determined that a risk level of the new event is equal to or higher than the reference value (L3) (N at step S110), the function of the guided event acquiring module 21a allows the control unit 20 to acquire a guided event (step S120). Specifically, the control unit 20 acquires a weather event, for which a time after the last turning-on (ACC-ON) of the vehicle is recorded as a guidance time in the weather event DB 30b, as a guided event. That is, the control unit 20 acquires a weather event having been guided during a period of time from a start of moving of the user riding on the vehicle until the present as a guided event.

Next, the function of the guidance control module 21b allows the control unit 20 to determine whether the new event is identical in weather type to the guided event (step S130). That is, the control unit 20 acquires the weather types of the new event and the guided event from the weather event DB 30b, and determines whether there is at least one guided event of the weather type identical to the weather type of the new event.

When it is determined that the new event is identical in weather type to the guided event (Y at step S130), the function of the guidance control module 21b allows the control unit 20 to determine whether occurrence regions of the new event and the guided event overlap with each other (step S140). Specifically, the control unit 20 acquires the occurrence region of the new event and the occurrence region of the guided event identical in weather type to the new event, and calculates an overlapping area that is an area of a portion where the occurrence regions overlap with each other. In addition, the control unit 20 calculates a total area that is an area of the occurrence region of the new event, and determines whether an area ratio obtained by dividing the overlapping area by the total area is equal to or more than a predetermined threshold (e.g., 30%).

When it is determined that the occurrence regions of the new event and the guided event overlap with each other (Y at step S140), the function of the guidance control module 21b does not allow the control unit 20 to guide the new event (step S150). That is, the control unit 20 determines not to guide the new event, and does not cause the user I/F unit 44 to output guidance about the new event.

When it is determined not to guide the new event, the function of the guided event acquiring module 21a does not allow the control unit 20 to record a guidance time for the new event by (step S160). That is, the control unit 20 records the fact that the new event subjected to no guidance has no guidance time in the weather event DB 30b. This enables preventing a new event subjected to no guidance from being acquired as a guided event.

When it is determined that the new event has a risk level equal to or higher than the reference value (L3) (Y at step S110), the function of the guidance control module 21b allows the control unit 20 to guide the new event (step S170). That is, the control unit 20 determines to guide a new event having a risk level higher than the predetermined reference value (L3) even when the new event is identical in weather type to a guided event, or has an occurrence region overlapping with that of the guided event.

When it is not determined that the new event is identical in weather type to the guided event (N at step S130), the function of the guidance control module 21b allows the control unit 20 to guide the new event (step S170). That is, the control unit 20 determines to guide the new event when a weather event identical in weather type to the new event is not guided.

When it is not determined that the new event has an occurrence region overlapping with that of the guided event (N at step S140), the function of the guidance control module 21b allows the control unit 20 to guide the new event (step S170). That is, the control unit 20 determines to guide the new event when a guided event identical in weather type to the new event has been already guided, but the guided event has an occurrence region that is significantly different from that of the new event.

When the new event is guided as described above, the function of the guided event acquiring module 21a allows the control unit 20 to record a guidance time for the new event (step S180). That is, the control unit 20 records a guidance time in the weather event DB 30b for a new event that has been guided. Accordingly, a new event that has been guided can be acquired as a guided event.

(3) Other Embodiments

In the present disclosure, the function of the guided event acquiring module 21a may allow the control unit 20 to acquire a weather event with an elapsed time from a time when the weather event is guided, the elapsed time being equal to or less than a predetermined determination period of time, as a guided event. Specifically, the control unit 20 may acquire a weather event for which a time prior to a time traced back in the past by a determination period of time (e.g., two hours) from a current time is recorded in the weather event DB 30b as a guidance time, as a guided event. That is, the control unit 20 may not acquire a weather event for which a certain period of time elapses after the weather event is guided, as a guided event. Accordingly, when the determination period of time elapses and a user has faded recognition of a weather event guided, a weather event that is identical in weather type to the guided event and that has an occurrence region overlapping with that of the guided event can be recognized again.

The embodiment described above is merely an example, and the present disclosure may be realized by processing different from the weather guidance processing of FIG. 3. For example, the execution order of steps S110, S130, and S140 of the weather guidance processing of FIG. 3 may be changed, or step S110 may be eliminated.

The control unit 20 may determine that occurrence regions of a new event and a guided event overlap with each other when an area ratio of a portion where the occurrence region of the guided event overlaps with the occurrence region of the new event is equal to or more than a threshold. That is, the area ratio used for threshold determination may have a denominator that is an area of the occurrence region of the guided event instead of an area of the occurrence region of the new event. In addition, the threshold of the area ratio may be approximately 0%, and the control unit 20 may determine that the occurrence regions of the new event and the guided event overlap with each other when there is even a little portion where the occurrence region of the guided event and the occurrence region of the new event overlap with each other.

In addition, the control unit 20 may not necessarily determine whether occurrence regions of a new event and a guided event overlap with each other based on an area ratio of a portion where the occurrence regions overlap with each other. For example, the control unit 20 may determine that occurrence regions of a new event and a guided event overlap with each other when the shortest distance between the occurrence region of the new event and the occurrence region of the guided event is equal to or less than a threshold. The control unit 20 also may determine that occurrence regions of a new event and a guided event overlap with each other when a distance between the center of gravity of the occurrence region of the new event and the center of gravity of the occurrence region of the guided event is equal to or less than a threshold.

In a first embodiment, a new event identical in weather type to a weather event guided before the last turning-on of a power source of a vehicle (during previous traveling or before) is guided, so that a weather event identical in ID may be guided again. When a weather event identical in ID is guided multiple times even in different travels, a user feels annoyed. Thus, the control unit 20 may be configured not to acquire a weather event identical in ID to a weather event once guided, as a new event. In addition, a valid period of time may be recorded for each weather event in the weather event DB 30b in FIG. 2A to prevent a weather event with a too-old occurrence time from being guided.

In the present disclosure, the weather guidance system needs to allow the guidance control unit to determine whether to guide a new event, and may not necessarily be an apparatus used in a vehicle. For example, the weather guidance system may be a server that distributes information about a new event determined to be guided to a terminal (a vehicles, a vehicle-mounted device, a mobile terminal, etc.) used by an occupant of each vehicle. A weather event has an occurrence region influenced by the weather event, and may be an event related weather (clear, cloudy, rainfall, snowfall, etc.), temperature, humidity, or disaster (storm, heavy rain, heavy snow, flood, storm surge, earthquake, tsunami, eruption, pyroclastic flow, ash fall, avalanche, wildfire, etc.). The weather event may be guided by voice or by an image. Guidance of the weather event may be guidance of contents of the weather event, or simple output of a warning sound or a warning image. The weather event also may be an event at a guidance time, or a future or past event at the guidance time.

A user may be moved using any moving means, and the moving means is not particularly limited. A weather event having occurred around the user may have an occurrence region with a distance from a location of the user, being shorter than a predetermined value, or have an occurrence region in which the user is located. The guided event acquiring unit needs to acquire a weather event that has been guided to the user in the past as a guided event. The past may be a period of time before the present. The period of time may have a fixed length, or may have a variable length in accordance with setting of the user or a risk level, for example.

A new event is a new weather event having occurred around the user, and may be a weather event that has newly occurred around the user or a weather event having an occurrence region with new ingress of the user. The guidance control unit may acquire all weather events and extract a new weather event having occurred around the user as a new event from the weather events. The guidance control unit also may request a server that manages weather information to transmit data indicating a new event around a current location of the user.

A weather type is a type of weather condition to be guided to the user, and is distinction among weather (clear, cloudy, rainfall, snowfall, etc.), temperature, humidity, and disaster (storm, heavy rain, heavy snow, flood, storm surge, earthquake, tsunami, eruption, pyroclastic flow, ash fall, avalanche, wildfire, etc.). For example, the guidance control unit may guide a weather type and a degree of a state corresponding to the weather type to the user. The guidance control unit also may guide an occurrence region or display the occurrence region on a map.

No guidance of a new event may not necessarily be guidance in which everything related to the new event is not to be guided. For example, while the guidance control unit guides a new event with a voice and an image when determining to guide the new event, the guidance control unit may guide a new event with only an image when determining not to guide the new event. In this case, the guidance control unit has determined not to guide the new event using the voice. As a matter of course, when determining not to guide a new event, the guidance control unit may not guide some contents of all contents to be guided when determining to guide the new event.

The guidance control unit may determine that occurrence regions of a new event and a guided event overlap with each other when an area ratio of a portion where the occurrence region of the new event overlaps with the occurrence region of the guided event is equal to or more than a threshold. In addition, a higher ratio of an area of a portion where occurrence regions overlap with each other increases possibility that a new event has occurrence factors, severity, or the like, common to those of the guided event. Thus, a level of necessity to newly guide the new event to the user can be appropriately determined. The threshold value may be a fixed value or a variable value. For example, the threshold value may be changed in accordance with setting of the user, or may be reduced as a risk level of the new event increases. The threshold value also may be set according to a weather type of a new event.

In addition, the guided event acquiring unit may acquire a weather event having been guided to the user from the last turning-on of the vehicle in which the user rides until the present as a guided event. Accordingly, a weather event that is identical in weather type to a guided event and that has an occurrence region overlapping with that of the guided event can be prevented from being repeatedly guided in one travel (from departure to parking). On the other hand, when travel is started again, a weather event can be guided without restriction.

The guided event acquiring unit also may acquire a weather event with an elapsed time from a time when the weather event is guided, the elapsed time being equal to or less than a predetermined determination period of time, as a guided event. Accordingly, a weather event that is identical in weather type to a guided event and that has an occurrence region overlapping with that of the guided event can be prevented from being guided again until a predetermined determination period of time elapses. On the other hand, when the determination period of time elapses and a user has faded recognition of a weather event guided, a weather event that is identical in weather type to the guided event and that has an occurrence region overlapping with that of the guided event can be recognized again.

In addition, the guidance control unit may determine to guide a new event having a risk level equal to or higher than a reference value regardless of whether the new event is identical in weather type to the guided event. Accordingly, a weather event with a risk level equal to or higher than the reference value can be guided even when the weather event is identical in weather type to the guided event. This enables the user to reliably recognize the weather event with the risk level equal to or higher than the reference value.

In addition, as in the present disclosure, a technique of selecting whether to guide a weather event identical in type in accordance with whether occurrence regions overlap with each other can be applied as a program or a method. The system, program, and method as described above may be realized as a single device, or may be realized using components shared with each unit provided in a vehicle, and thus include various aspects. For example, a weather guidance system provided with a device as described above, a weather guidance method, and a weather guidance program can be provided. In addition, the technique described above may be appropriately changed to be formed partly of software and partly of hardware, for example. The present disclosure is also established as a recording medium for a program for controlling an apparatus. As a matter of course, the software recording medium may be a magnetic recording medium or a semiconductor memory, and any recording medium that will be developed in the future is quite similarly conceivable.

What is claimed is:

1. A weather guidance system configured to guide a weather event having occurred around a user during moving, the weather guidance system comprising:
   a control unit having a central processing unit and a memory and an interface unit communicatively coupled to the control unit, the control unit configured to:
   acquire a guided event being a weather event previously guided to the user;
   determine that, when a new event being a new weather event having occurred around the user is acquired, the new event that is identical in weather type to the guided event and that has an occurrence region without overlapping with an occurrence region of the guided event is guided, and the new event that is identical in weather type to the guided event and that has an occurrence region overlapping with the occurrence region of the guided event is not to be guided; and cause the interface unit to output a voice message indicating the weather type of the new event and display an outline of the occurrence region of the new event on a screen of the interface unit, when determined that the new event is guided.

2. The weather guidance system according to claim 1, wherein the control unit is further configured to:

determine that the occurrence regions of the new event and the guided event overlap with each other when an area ratio of a portion where the occurrence region of the new event overlaps with the occurrence region of the guided event is equal to or more than a threshold.

3. The weather guidance system according to claim 2, wherein the control unit is further configured to:

acquire the weather event having been guided to the user from last turning-on of a vehicle in which the user rides until a present as the guided event.

4. The weather guidance system according to claim 3, wherein the control unit is further configured to:

determine to guide the new event having a risk level equal to or higher than a reference value regardless of whether the new event is identical in weather type to the guided event.

5. The weather guidance system according to claim 2, wherein the control unit is further configured to:

acquire the weather event with an elapsed time from a time when the weather event is guided, the elapsed time being equal to or less than a predetermined determination period, as the guided event.

6. The weather guidance system according to claim 5, wherein the control unit is further configured to:

determine to guide the new event having a risk level equal to or higher than a reference value regardless of whether the new event is identical in weather type to the guided event.

7. The weather guidance system according to claim 2, wherein the control unit is further configured to:

determine to guide the new event having a risk level equal to or higher than a reference value regardless of whether the new event is identical in weather type to the guided event.

8. The weather guidance system according to claim 1, wherein the control unit is further configured to:

acquire the weather event having been guided to the user from last turning-on of a vehicle in which the user rides until a present as the guided event.

9. The weather guidance system according to claim 8, wherein the control unit is further configured to:

determine to guide the new event having a risk level equal to or higher than a reference value regardless of whether the new event is identical in weather type to the guided event.

10. The weather guidance system according to claim 1, wherein the control unit is further configured to:

acquire the weather event with an elapsed time from a time when the weather event is guided, the elapsed time being equal to or less than a predetermined determination period, as the guided event.

11. The weather guidance system according to claim 10, wherein the control unit is further configured to:

determine to guide the new event having a risk level equal to or higher than a reference value regardless of whether the new event is identical in weather type to the guided event.

12. The weather guidance system according to claim 1, wherein the control unit is further configured to:

determine to guide the new event having a risk level equal to or higher than a reference value regardless of whether the new event is identical in weather type to the guided event.

13. The weather guidance system according to claim 1, wherein the control unit is further configured to cause the interface unit to display a button for transitioning to the screen showing details of the new event.

14. The weather guidance system according to claim 2, wherein the area ratio is obtained by dividing the overlap, the overlap being an overlapping area of the occurrence region of the new event and the occurrence region of the guided event by a total area of the occurrence region of the new event and the occurrence region of the guided event.

15. A weather guidance program configured to cause a computer to serve as a weather guidance system configured to guide a weather event having occurred around a user during moving, the weather guidance program causing the computer to:

acquire a guided event being a weather event previously guided to the user;

determine that when a new event being a new weather event having occurred around the user is acquired, the new event that is identical in weather type to the guided event and that has an occurrence region without overlapping with an occurrence region of the guided event is guided, and the new event that is identical in weather type to the guided event and that has an occurrence region overlapping with the occurrence region of the guided event is not to be guided; and cause an interface unit to output a voice message indicating the weather type of the new event and display an outline of the occurrence region of the new event on a screen of the interface unit, when determined that the new event is guided.

* * * * *